United States Patent
Heinzelmann

(10) Patent No.: US 6,915,764 B2
(45) Date of Patent: Jul. 12, 2005

(54) FLYWHEEL FOR AN INTERNAL COMBUSTION ENGINE

(75) Inventor: Georg Heinzelmann, Spiegelberg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 10/774,531

(22) Filed: Feb. 10, 2004

(65) Prior Publication Data

US 2004/0168541 A1 Sep. 2, 2004

(30) Foreign Application Priority Data

Feb. 27, 2003 (DE) .......................... 103 08 428

(51) Int. Cl.$^7$ ................ F01P 7/04; F02P 1/00
(52) U.S. Cl. .................. 123/41.63; 123/149 D
(58) Field of Search .................. 123/41.63, 149 R, 123/149 D

(56) References Cited

U.S. PATENT DOCUMENTS 4,179,634 A * 12/1979 Burson .................... 123/149 R
4,606,305 A * 8/1986 Campen .................. 123/149 R

* cited by examiner

Primary Examiner—Noah P. Kamen
(74) Attorney, Agent, or Firm—Walter Ottesen

(57) ABSTRACT

A flywheel (1) for an internal combustion engine is provided for generating a cooling air flow and is especially for a two-stroke engine on a portable handheld work apparatus such as a motor-driven chain saw, cutoff machine or the like. The flywheel (1) carries a parallelopipedly-shaped permanent magnet (5) for a magnetic ignition system. The permanent magnet has a short edge (6), a center edge (7) and a long edge (8). The permanent magnet (5) is polarized in the direction of the short edge (6). To provide a high moment of inertia of the flywheel (1) while achieving a low weight, the short edge of the permanent magnet (5) runs tangentially to the peripheral direction of the flywheel (1) and that the long edge (8) of the permanent magnet (5) is aligned parallel to the rotational axis (11) of the flywheel (1).

10 Claims, 1 Drawing Sheet

FLYWHEEL FOR AN INTERNAL COMBUSTION ENGINE

CROSS REFERENCE TO RELATED APPLICATION

This application claims priority of German patent application no. 103 08 428.2, filed Feb. 27, 2003, the entire content of which is incorporated herein by reference.

FIELD OF THE INVENTION

The invention relates to a flywheel for an internal combustion engine including a two-stroke engine in a portable handheld work apparatus such as a motor-driven chain saw, cutoff machine or the like.

BACKGROUND OF THE INVENTION

Flywheels of this kind are provided with vanes for cooling the engine and are generally known. The flywheel is intended to compensate for rpm fluctuations of the engine. For this purpose, a high moment of inertia of the flywheel is advantageous. At the same time, the overall weight of the flywheel should, however, be as low as possible especially in two-stroke engines in portable handheld work apparatus such as motor-driven chain saws, cutoff machines or the like. A magnet for a magnetic ignition system is usually integrated into the flywheel. Magnets of this kind are manufactured industrially in large numbers. These magnets are configured to have approximately the shape of a parallelopiped and are polarized in the direction of the short edge. In order for the influence on the cooling air flow to be a minimum, magnets of this kind usually are mounted with the short edge in the peripheral direction of the flywheel and with the long edge in the radial direction thereof.

SUMMARY OF THE INVENTION

It is an object of the invention to provide a flywheel which has a high moment of inertia while having a low overall weight and simultaneously ensuring an adequate supply of cooling air.

The flywheel of the invention is for an internal combustion engine including a two-stroke engine in a portable handheld work apparatus. The flywheel includes: a body defining an axis of rotation; a vane configuration on the body for generating a flow of cooling air; a parallelopipedly-shaped permanent magnet carried by the body for a magnetic ignition system; the permanent magnet having a short edge, a center edge and a long edge; the permanent magnet being polarized in the direction of the short edge; the short edge of the permanent magnet running approximately tangential to the peripheral direction of the flywheel; and, the long edge of the permanent magnet being aligned approximately parallel to the axis of rotation.

The center of gravity of the permanent magnet can be displaced far outwardly, that is, at a large distance from the rotational axis, by arranging the long edges of the permanent magnet parallel to the rotational axis of the flywheel. The moment of inertia of the flywheel then increases for the same weight of the flywheel. An arrangement of the magnet in this way leads to the situation that the vane configuration has only a very slight elevation in the region of the magnet. The influence on the movement of air can, however, be held low by a flow-facilitating configuration of the flywheel.

Advantageously, the permanent magnet extends at least over half of the elevation of the flywheel measured in the direction of the rotational axis. It is practical that pole shoes are mounted on both sides of the permanent magnet in the peripheral direction of the flywheel. The pole shoes guide the magnetic field on both sides of the permanent magnet to the outer periphery of the flywheel. A flow-favorable configuration of the flywheel is achieved in that the elevation of the pole shoes, which is measured in the direction of the longitudinal axis, is greater on the side facing toward the permanent magnet than the elevation on the side facing away from the permanent magnet. The ends of the pole shoes, which lie in the peripheral direction, run especially toward each other in an arcuate shape. In this way, the influence of the magnet on the moved air quantity can be held low, the magnet being mounted in the region of the vane configuration. The arcuately-shaped configuration prevents sharp edges in the course of flow. The uniform flow, which is provided hereby, leads to the situation that the losses caused by turbulence are low.

The flywheel has a partition wall on which the permanent magnet is fixedly mounted. The flywheel is provided with a vane configuration on both sides of the partition wall. Accordingly, the fan wheel here is a fan wheel having a vane configuration on the rearward side. It is provided that the partition wall runs on the periphery of the flywheel at a distance to an end face of the flywheel which corresponds approximately to one-third the elevation of the flywheel. The vane configuration thereby has different elevations on both sides of the partition wall in the region of the periphery. An advantageous configuration results when the partition wall is configured to be widened in the region of the pole shoes and the pole shoes are embedded in the partition wall.

In order to avoid an imbalance of the flywheel, a counterweight is mounted on the flywheel opposite the permanent magnet. The flywheel is configured as a cast part, especially, as an aluminum pressure die-cast part.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
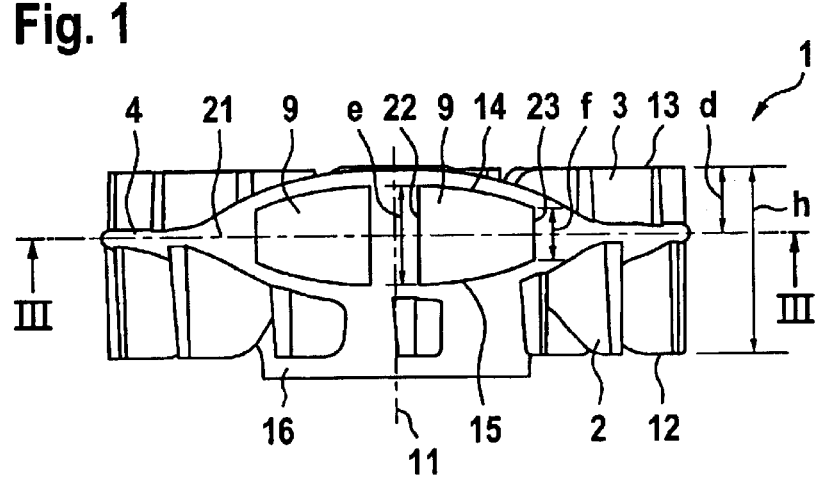
FIG. 1 is a plan view of the flywheel.
Figure 2:
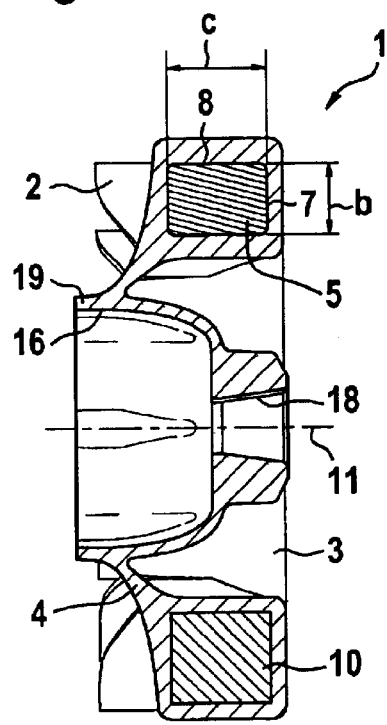
FIG. 2 is a section view of the flywheel taken along line II—II of FIG. 3.
Figure 3:
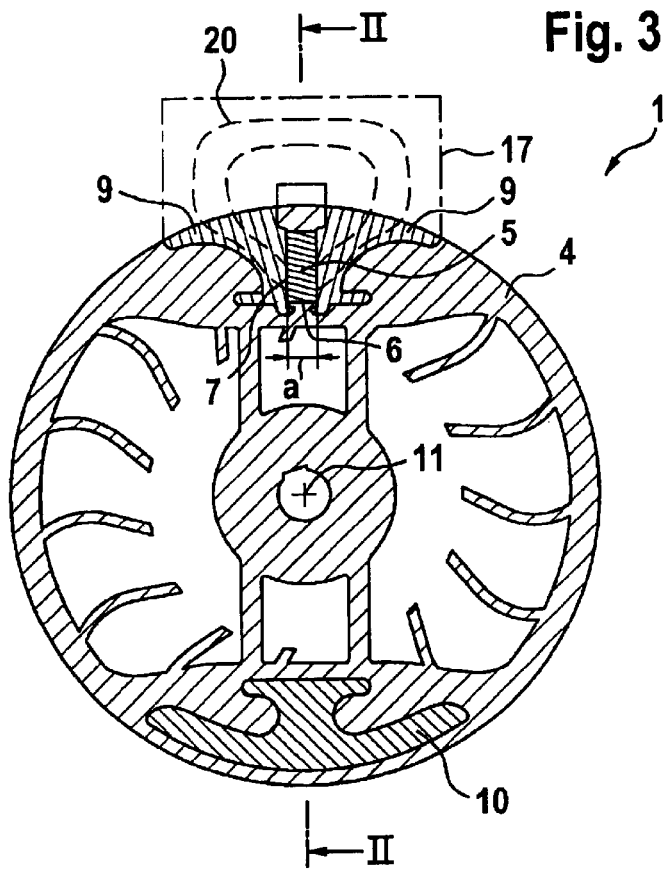
FIG. 3 is a section view of the flywheel taken along line III—III in FIG. 1.

FIGS. 1 to 3 show a flywheel 1 for mounting on an internal combustion engine. The internal combustion engine is especially a two-stroke engine in a portable handheld work apparatus such as a motor-driven chain saw, cutoff machine or the like.

The flywheel is configured to be substantially rotationally symmetrical to a rotational axis 11. The flywheel 1 is fixed to the crankshaft of the internal combustion engine with the receptacle 18 shown in FIG. 2. Fixation takes place with fastening means, for example, a nut which is mounted over the opposite-lying receptacle 16. The receptacle 16 is configured to have a pot-like shape and is open on the front side 12 of the flywheel 1. The front side 12 is the side facing away from the engine; whereas, the rearward side 13 faces toward the engine. The receptacle 18 is open toward the rearward side 13.

The flywheel 1 has a partition wall 4 which is fixed to the edge 19 of the receptacle 16 and extends outwardly up to the periphery of the flywheel 1. The edge 19 projects on the forward side 12. The distance of the partition wall 4 to the forward side 12 increases in the outward radial direction. The partition wall 4 has a distance (d) toward the rearward side 13 at the periphery of the flywheel 1 and this distance corresponds to approximately one-third of the elevation (h) of the flywheel 1. The elevation (h) of the flywheel is the extension of the flywheel in the region of the periphery parallel to the rotational axis 11.

The flywheel 1 is configured as a fan wheel and has a forward-side vane configuration 2 on the side of the partition wall 4 which faces toward the forward side 12 as well as a rearward-side vane configuration 3 on the opposite-lying side of the partition wall 4. The vane configurations (2, 3) function to generate a cooling air flow for the internal combustion engine.

The flywheel 1 carries a permanent magnet 5 for a magnetic ignition system. As shown in FIGS. 2 and 3, the permanent magnet 5 has a parallelopiped shape and has a short edge 6 of length (a), a center edge 7 having a length (b) and a long edge 8 having a length (c). The length (c) is greater than the length (b); whereas, the length (a) is less than the length (b). The permanent magnet 5 is polarized in a direction parallel to the short edge 6. The field lines 20 are shown by broken lines in FIG. 3 and are perpendicular to a plane defined by boundary edges 7 and 8. The permanent magnet 5 induces a voltage for the ignition of the engine. For this purpose, an armature 17 is mounted at the periphery of the flywheel 1 and is shown in FIG. 3 by a dot-dash line.

In order to conduct the magnetic field toward the outside, pole shoes 9 are mounted on both ends of the permanent magnet 5 in the peripheral direction. The pole shoes 9 extend at the planes defined by the edges 7 and 8 and project up to the periphery of the flywheel 1. For the position of the flywheel 1 shown in FIG. 3, the field lines 20 are closed via the permanent magnet 5, the pole shoes 9 and the armature 17. The long edge 8 of the permanent magnet 5 has a length (c) which is at least half the elevation (h) of the flywheel 1. The height of the vane configuration arranged in this region is reduced by the arrangement of the permanent magnet 5 and the pole shoes 9.

As shown in FIG. 1, the pole shoes 9 are mounted in a section of the partition wall 4 configured to be widened. The pole shoes extend approximately symmetrically on both sides of the plane 21 formed by the partition wall 4. The pole shoes 9 have an elevation (e) at the side 22 facing toward the magnet 5 and this elevation (e) corresponds approximately to the length (c) of the long edge 8 of the permanent magnet 5. On the opposite-lying side 23, which faces away from the permanent magnet 5, the pole shoes 9 have an elevation (f) which is less than the length (e) and is especially approximately half the length of the length (e). The sides 14 and 15 of the pole shoes 9 run from the side 22 to the end opposite-lying side 23 toward each other with an arcuate shape. The pole shoes 9 are enclosed at the sides 14 and 15 by the partition wall 4. The partition wall 4 continues to be configured arcuately in the peripheral direction outside of the pole shoes 9 so that a flow-favorable course of the partition wall 4 results.

In order to avoid an imbalance of the flywheel 1, a counterweight 10 is mounted to lie opposite the permanent magnet 5 referred to the rotational axis 11. The counterweight 10 is embedded in the flywheel 1 as are the permanent magnet 5 and the two pole shoes 9. The flywheel is especially configured as a cast part and is advantageously configured as an aluminum pressure die-cast part.

It is understood that the foregoing description is that of the preferred embodiments of the invention and that various changes and modifications may be made thereto without departing from the spirit and scope of the invention as defined in the appended claims.

What is claimed is:

1. A flywheel for an internal combustion engine including a two-stroke engine in a portable handheld work apparatus, the flywheel comprising:

a body defining an axis of rotation;

a vane configuration on said body for generating a flow of cooling air;

a parallelopipedly-shaped permanent magnet carried by said body for a magnetic ignition system;

said permanent magnet having a short edge, a center edge and a long edge;

said permanent magnet being polarized in the direction of said short edge;

said short edge of said permanent magnet running approximately tangential to the peripheral direction of said flywheel;

said long edge of said permanent magnet being aligned approximately parallel to said axis of rotation;

first and second pole shoes arranged on respective sides of said permanent magnet viewed in the peripheral direction;

each of said pole shoes having a first end facing toward said permanent magnet and a second end facing away from said permanent magnet;

said first end having an elevation (e) measured in the direction of said rotational axis and said second end having an elevation (f); and, said elevation (e) of said first end being greater than said elevation (f) of said second end.

2. The flywheel of claim 1, wherein said flywheel has an elevation (h) measured in the direction of said rotational axis; and, said permanent magnet extends at least over half of said elevation (h).

3. The flywheel of claim 2, said body including a partition wall and said permanent magnet being fixedly mounted on said partition wall.

4. The flywheel of claim 1, wherein each of said poles has first and second sides lying in the peripheral direction and said first and second sides are curved toward each other.

5. The flywheel of claim 1, further comprising a counterweight disposed on said flywheel opposite said permanent magnet.

6. The flywheel of claim 1, wherein said body is a cast part.

7. The flywheel of claim 1, wherein said body is an aluminum pressure-cast part.

8. A flywheel for an internal combustion engine including a two-stroke engine in a portable handheld work apparatus, the flywheel comprising:

a body defining an axis of rotation;

a vane configuration on said body for generating a flow of cooling air;

a parallelopipedly-shaped permanent magnet carried by said body for a magnetic ignition system;

said permanent magnet having a short edge, a center edge and a long edge;

said permanent magnet being polarized in the direction of said short edge;

said short edge of said permanent magnet running approximately tangential to the peripheral direction of said flywheel; and, said long edge of said permanent magnet being aligned approximately parallel to said axis of rotation;

said flywheel having an elevation (h) measured in the direction of said rotational axis;

said permanent magnet extending at least over half of said elevation (h);

said body including a partition wall and said permanent magnet being fixedly mounted on said partition wall; and, said vane configuration being a first vane configuration on one side of said partition wall and said flywheel further comprising a second vane configuration on the other side of said partition wall.

9. The flywheel of claim 8, wherein said flywheel has an end face transverse to said rotational axis; and, said partition wall defines the peripheral surface of said flywheel and said partition wall is at a distance (d) from said end face of said flywheel and said distance (d) is approximately one third of said elevation (h) of said flywheel.

10. The flywheel of claim 8, wherein said partition wall is configured to be widened in the region of said pole shoes and said pole shoes are embedded in said partition wall.

* * * * *